United States Patent [19]
Stampe

[11] Patent Number: 5,896,830
[45] Date of Patent: Apr. 27, 1999

[54] ELECTRICAL APPARATUS FOR DISCOURAGING ANIMALS FROM INSTINCTIVELY LICKING THEIR WOUNDS

[76] Inventor: David A. Stampe, 13867 Garrett Ave., Apple Valley, Minn. 55124

[21] Appl. No.: 08/994,082

[22] Filed: Dec. 19, 1997

[51] Int. Cl.⁶ .................................................. A01K 15/00
[52] U.S. Cl. ............................................ 119/822; 128/882
[58] Field of Search ........................... 119/822; 128/878, 128/879, 880, 881, 882

[56] References Cited

U.S. PATENT DOCUMENTS

| | | |
|---|---|---|
| 2,177,789 | 10/1939 | Sacker . |
| 3,042,036 | 7/1962 | Abadjieff . |
| 4,153,009 | 5/1979 | Boyle ..................................... 119/822 |

OTHER PUBLICATIONS

Brochure entitled "3M Electrically Conductive Tape 9703", Aug., 1995.

*Primary Examiner*—Thomas Price
*Attorney, Agent, or Firm*—Edward Hotchkiss; Skinner and Associates

[57] ABSTRACT

An electrically actuated apparatus for discouraging animals from instinctively licking their wounds including an elongated flexible substrate which is foldable upon itself to form a laminate configuration with a battery receiving pocket formed at the fold-over area. Conductive traces are provided in circuit with the battery power source to provide a field across the exposed conductive traces to deliver an electrical impulse to the animal upon contact with the tongue or other sensitive tissues surrounding the mouth. In addition, a pressure sensitive adhesive layer is provided to coat the back surface of the laminate configuration to bond the apparatus to the body of the animal in a location closely adjacent the site of the wound.

10 Claims, 3 Drawing Sheets

ELECTRICAL APPARATUS FOR DISCOURAGING ANIMALS FROM INSTINCTIVELY LICKING THEIR WOUNDS

BACKGROUND OF THE INVENTION

The present invention relates generally to an electrically actuated apparatus for discouraging animals from instinctively licking their wounds, and more particularly to an apparatus which is provided with a self-contained power source and has exposed conductive traces for completing a circuit through the animal's tongue whenever it comes in contact with adjacent conductive traces. The apparatus has been found to be particularly useful for use when pets such as dogs or cats suffer wounds and their instinctive licking of the wounds impairs their prompt healing. The apparatus is further adapted for use with larger domestic animals who frequently suffer wounds and also develop certain "hot spots" during continued exposure to certain skin aggravating conditions.

In the past, various devices have been proposed and/or employed for use in discouraging animals from this practice. These devices, for the most part, have been cumbersome and difficult to controllably position on the skin adjacent the wound. Furthermore, prior art devices tend to be large and cumbersome, and hence susceptible of being removed by the animal through rubbing contact with stationary objects.

SUMMARY OF THE INVENTION

In accordance with the present invention, however, an electrical apparatus has been designed for discouraging animals from their instinctive licking of wounds, with the apparatus being a self-contained relatively flat device containing a battery power source in captured disposition therewithin. Essentially, the apparatus of the present invention comprises an elongated flexible substrate which is foldable upon itself to form a composite laminate, with the laminate having conductive trace means positioned in spaced apart relationship along a major surface of the laminate configuration. Additionally, the battery power source is coupled and in circuit with the exposed conductive traces, and is captured between folded over segments of the substrate means which form the laminate configuration. Conductive adhesive couples the traces to the battery power source and completes the circuit path. In addition, a layer of pressure sensitive adhesive is provided on the second major surface of the laminate configuration to hold and/or bond the apparatus to the body of the animal in a location adjacent the site of the wound. In this arrangement, the conductive trace means are disposed so that upon contact with the animal's tongue an electrical circuit is completed through the tongue and an electrical impulse accordingly delivered through the sensitive tissues of the animal.

Therefore, it is a primary object of the present invention to provide an improved electrically actuated apparatus for discouraging and dissuading animals from instinctively licking their wounds, with the apparatus comprising adjacently positioned conductive traces which permit an electrical circuit to be completed through the sensitive tissues of the animal.

It is a further object of the present invention to provide an improved electrically actuated apparatus for discouraging and dissuading animals from instinctively licking their wounds wherein an elongated flexible substrate, foldable upon itself to form a receiving station for a battery power source, and wherein circuit means are provided to place conductive traces in adjoining relationship to permit an electrical charge to pass through the sensitive tongue tissue of the animal when the tongue touches adjacent traces.

It is a further object of the present invention to provide an electrically actuated apparatus for discouraging and dissuading animals from instinctively licking their wounds wherein the invention includes a laminate body having a first major surface with conductive traces positioned thereon for delivering an electrical impulse to the animal upon contact with the animal's tongue, and wherein the second major surface is provided with a layer of pressure sensitive adhesive for attaching the apparatus to the body of the animal in a location adjacent the site of the wound.

Other and further objections of the present invention will become apparent to those skilled in the art upon a study of the following specification, accompanying drawings, and appended claims.

IN THE DRAWINGS

DESCRIPTION OF THE PREFERRED EMBODIMENT

Figure 5:
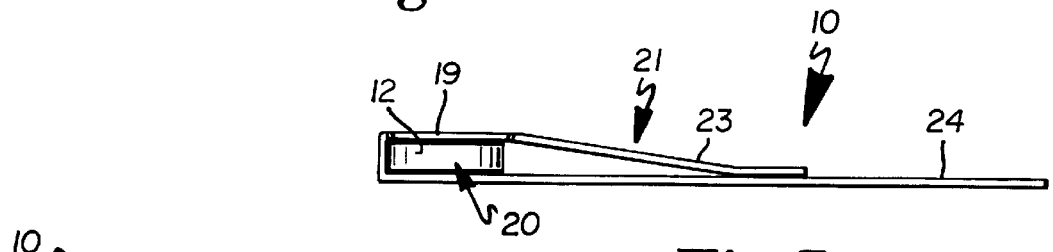
FIG. 5 is a side elevational view following placement of the battery power source and insertion within the pocket receptacle formed in the elongated flexible substrate upon folding.

In accordance with the preferred embodiment of the present invention, the electrically actuated apparatus for discouraging animals from licking their wounds is shown generally at 10, with the apparatus including an elongated flexible substrate means 11 which is foldable upon itself to form a composite laminate configuration as illustrated in FIG. 5. The apparatus further includes a battery power source 12 which is coupled in circuit with conductive traces provided on surfaces of the substrate as set forth hereinafter. Accordingly, and with reference to FIG. 1 of the drawings, conductive traces are provided as indicated at 14 and 15, with adjacent traces being coupled to opposite poles of the battery power source 12. Additionally, a complementary/ cooperating set of traces is provided at 16 and 17 to provide additional areas for exposure to the tongue of the animal.

Figure 6:
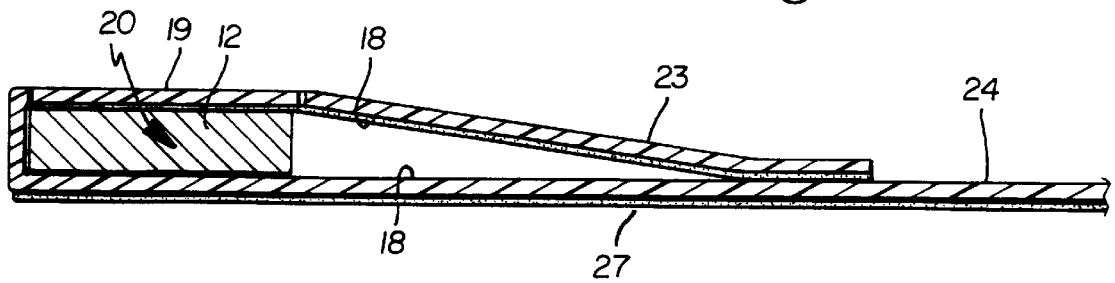
FIG. 6 is an enlarged view of FIG. 5 taken along he line and in the direction of the arrows 6—6 of FIG. 2, and illustrating the detail of coatings applied to various surface portions of the elongated flexible substrate.

In order to provide for electrical continuity between the opposite poles of the battery power source, conductive adhesive pads are provided at 18 and 19 in order to capture and retain the battery power source 12 in position within the pocket zone 20 formed upon fold-over of the elongated flexible substrate means 11. Thus, as indicated, the elongated flexible substrate means is folded over upon itself to form a composite laminate configuration as seen in FIGS. 5 and 6, and with parallelly disposed conductive trace means being positioned in spaced relationship along a first resulting surface of the laminate, as shown generally at 21. Also as indicated above, the battery power source 12 is in circuit with the conductive trace means and is captured in the pocket formed between the folded-over segments of the substrate means, thus fixing the battery source within the folded-over laminate configuration. In order to provide for electrical contact to the battery surface, pad 19 may be cut at its perimeter in a semicircular fashion as illustrated at 19A, and thereafter folded over as indicated at 19B to provide a pad for electrical contact to the remaining portions of the conductive traces 14. Pads or coatings of conductive adhesive such as illustrated at 18 and 19 are used to secure the battery in place and to retain the elongated flexible substrate in its folded-over configuration to create the electrically actuated apparatus 10.

Figure 2:
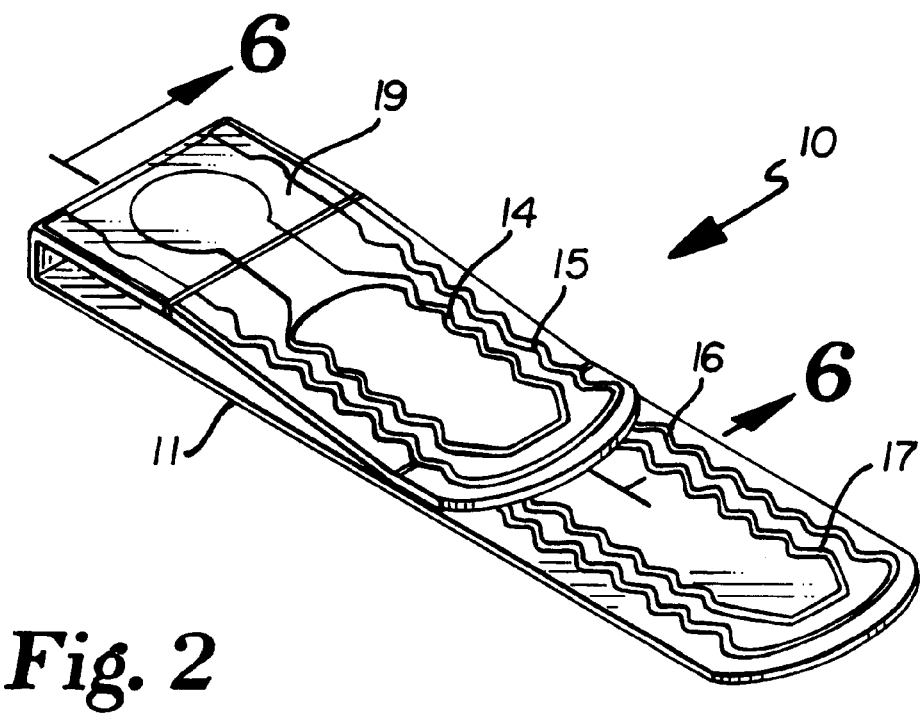
FIG. 2 is a perspective view of the electrically actuated apparatus showing a first major surface of the device with exposed traces arranged in parallel relationship thereon.
Figure 3:
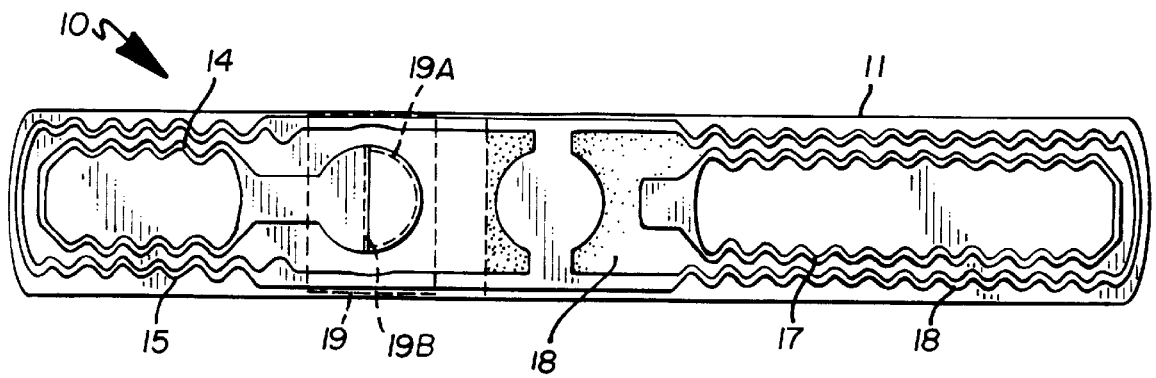
FIG. 3 is a top plan view of an elongated flexible substrate means which is foldable upon itself to form a composite laminate configuration including a pocket receptacle for a battery power source, with FIG. 3 illustrating the configuration prior to the fold-over operation.
Figure 4:
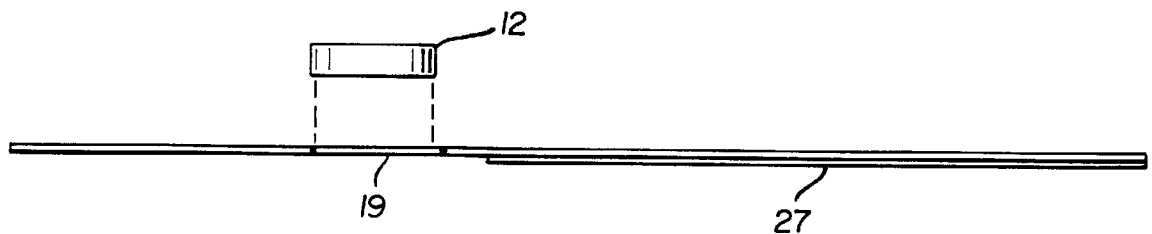
FIG. 4 is an exploded elevational view showing the elongated flexible substrate with a battery power source in exploded disposition therefrom.

In order to provide for the conductive traces and line definition thereof, the traces 14 and 15 may be formed in the configuration illustrated in FIG. 2, or, alternatively, they may be delineated by means of appropriate covering or laminating with coverlay film. Coverlay film permitting the edges of the conductive areas such as at 14 will permit appropriate delineation of the conductive traces.

With attention being directed to FIG. 6 of the drawings, the adhesive pads or layers as at 18 and 19 and at 19C are illustrated in the sectional view of FIG. 6. Also as is apparent, there is no adhesive present on the surface of the substrate segments shown as at 23 and 24. It will be appreciated that segments 23 and 24 are, of course, formed from the folded-over configuration of the substrate and accordingly form portions of the first major surface, this being the surface upon which the conductive traces are exposed.

Figure 1:
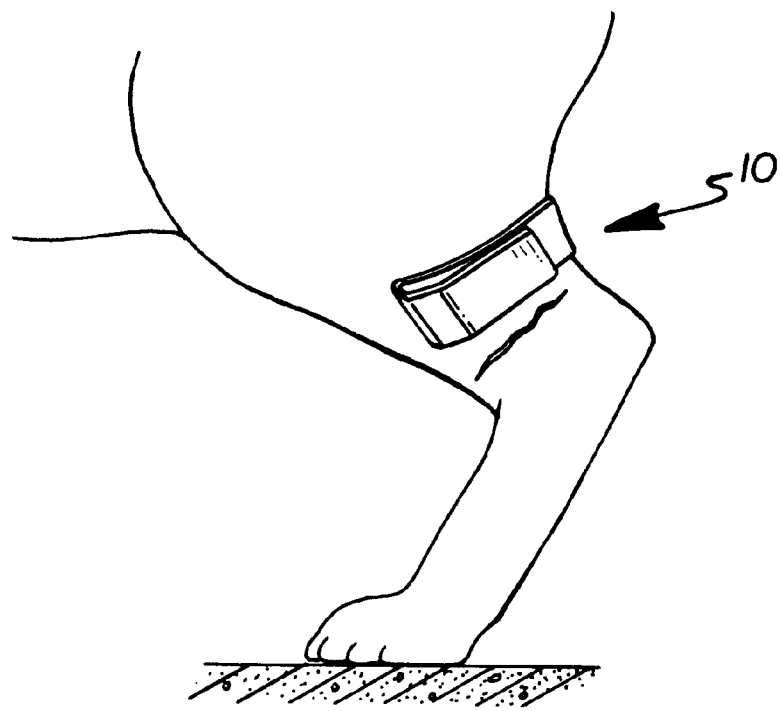
FIG. 1 is a partial side view of the body of a pet, typified as a dog, having the apparatus of the present invention adhesively secured to the leg in a location adjacent the site of a wound.

In addition, pressure sensitive adhesive layer is provided at 27 in order to attach or otherwise secure the apparatus to the surface of the skin of the effected animal, with this mounted configuration being illustrated in FIG. 1 of the drawings.

ALTERNATE PREFERRED EMBODIMENT

Figure 7:
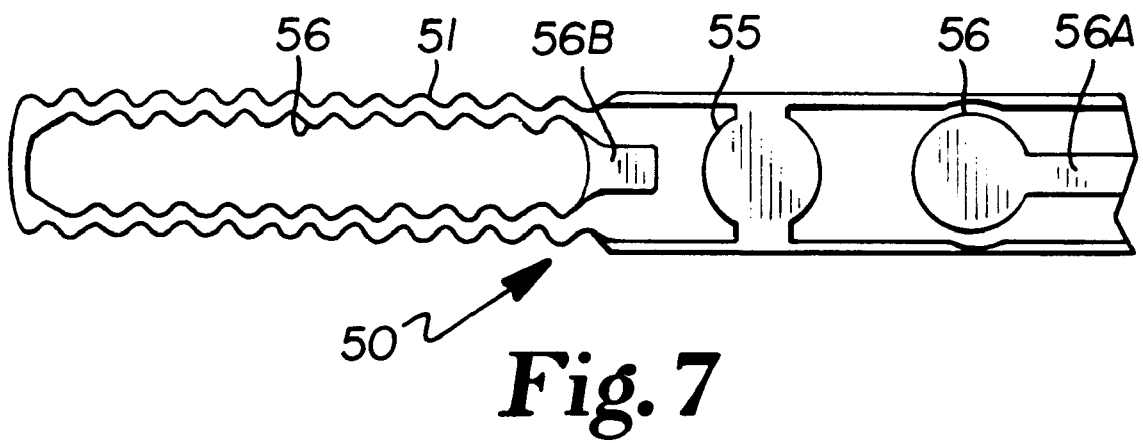
FIG. 7 is a top plan view of an alternate preferred embodiment of the present invention, with the substrate in its flat and unfolded configuration.
Figure 8:
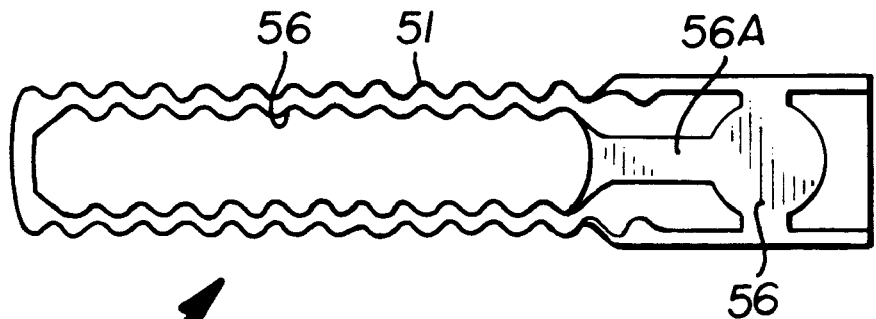
FIG. 8 is a top plan view of the substrate of FIG. 7 in folded disposition.

In the alternate preferred embodiment of FIG. 7, the substrate generally shown at 50 is provided with conductive trace means as at 51 and 52, and is further provided with conductive pads 55 and 56 for contact with the battery or power cell. Preferably pads 55 and 56 are formed of conductive pressure sensitive adhesive for transferring electrical energy from the cell to the individual conductive trace means.

Upon folding-over of the substrate 50, the power cell or battery is captured in the pocket formed by the fold-over operation, and the conductive pad 55 is in circuit with conductive trace means 51, while conductive pad 56 is in circuit with conductive trace means 52. Tang portions 56A and 56B are in contact to close the circuit. The operation and functional features of this configuration are similar to those of the structure of the embodiment of FIGS. 1–6 hereinabove.

As will be appreciated, the elongated flexible substrate is preferably formed from a tear-resistant durable plastic substance, with a highly suited material being stress oriented polyethyleneterephthalate available under the trade designation "Mylar" from E.I. duPont deNemours Corp. of Wilmington, Del. Other durable substrates may be utilized as well, it being noted, however, that the polyester material, polyethyleneterephthalate provides a desirable substrate for receiving layers or films of adhesive and other coatings thereon. The conductive trace means are preferably created by forming a coating of electrically conductive carbon or silver impregnated carbon at 60% silver, 40% carbon, and such coatings are commercially available. A suitable battery power source is a button-type battery having an output of about 3 volts. Button batteries having outputs of up to 3.6 volts are also commercially available. These may be stacked in series to provide an output which is a multiple of 3 volts. Certain animals have a higher degree of sensitivity to the flow of electrical current, and accordingly voltage sources having an output of between 4 volts and 6 volts may be appropriately utilized.

As has been indicated above, the apparatus of the present invention is particularly suited and desirable for use in combination with pets such as dogs and cats, and is also useful on larger domesticated stock.

It will be appreciated that the examples given herein are for purposes of illustration only and are not to be regarded as limiting the scope and substance of the appended claims of this application.

What is claimed is:

1. Electrically actuated apparatus for discouraging animals from instinctively licking their wounds, comprising:
   (a) an elongated flexible substrate means foldable upon itself to form a laminate configuration with first and second major surfaces resulting from the fold-over operation and having conductive trace means positioned in spaced apart relationship along the first major surface of said laminate configuration;
   (b) a battery power source in circuit with said exposed conductive trace means and being captured between folded-over segments of said substrate means;
   (c) a layer of electrically conductive adhesive coating portions of said folded-over segments for adhesively securing said battery power source in place and for electrically coupling said battery power source to said conductive trace means;
   (d) a pressure sensitive adhesive layer coating at least portions of the second major surface of said laminate configuration to bond said apparatus to the body of an animal in a location closely adjacent a site of a wound;
   (e) said conductive trace means being disposed so that when in contact with the animal's tongue, an electrical circuit is completed and an electrical impulse is delivered through the tongue's tissues.

2. The apparatus of claim 1 wherein the conductive trace means have a parallelly disposed serrated configuration.

3. The apparatus of claim 1 wherein the conductive trace means are a flexible film impregnated with conductive carbon particles.

4. Electrically actuated apparatus for discouraging animals from instinctively licking their wounds, comprising:
   (a) a laminate body having an inner surface and an outer surface, the outer surface having exposed conductive traces positioned therealong, the laminate body comprising an elongated flexible substrate folded upon itself to define a pocket receptacle;
   (b) an electrical power source retained within the pocket receptacle in the folded substrate, the power source being electrically coupled to said exposed conductive traces;

(c) an adhesive carried by the inner surface of the laminate to bond the laminate to the body of an animal with the conductive traces exposed adjacent a wound so that when the conductive traces contact the animal's tongue, the tongue completes an electrical circuit is completed and an electrical impulse is delivered through the tongue.

5. The apparatus of claim 4 wherein the electrical power source comprises at least one battery, the power source having an output potential of between about 3 volts and about 6 volts.

6. The apparatus of claim 4 wherein the electrical power source comprises at least one battery, adjacent conductive traces being electrically coupled to opposite poles of the battery.

7. The apparatus of claim 4 wherein the electrical power source is retained within the pocket receptacle by means of an electrically conductive adhesive, the adhesive further serving to electrically couple the power source to the conductive traces.

8. The apparatus of claim 4 wherein the substrate comprises first and second segments, the first segment being folded over the second segment to define the pocket receptacle, the first and second segments being attached to one another by an adhesive.

9. The apparatus of claim 8 wherein the substrate comprises first and second segments, the substrate in its flat, unfolded configuration having two opposite surfaces which run along both of the first and second segments, the outer surface of the laminate body comprising one surface of the substrate along the first segment and the opposite surface of the substrate along the second segment.

10. A method of deterring an animal from licking a wound, comprising:

(a) providing an electrical power source and an elongate, flexible substrate having first and second segments, conductive traces extending along each of the first and second segments;

(b) placing the electrical power source on a surface of the substrate adjacent a junction of the first and second segments and folding the first segment over the second segment to define a laminate body having an outer surface defined by a surface of the first segment and a surface of the second segment and an inner surface, folding the first segment over the second segment simultaneously capturing the electrical power source between the first and second segments and electrically connect the electrical power source to the conductive traces;

(c) attaching the resulting laminate body to the animal adjacent the wound such that the conductive traces of the first segment and the conductive traces of the second segment of the substrate are both exposed on the outer surface of the laminate body; and (d) delivering an electrical impulse of no more than about 6 volts to the animal's tongue to deter the animal from licking the wound.

\* \* \* \* \*